United States Patent [19]

Woodhouse

[11] Patent Number: 4,482,609

[45] Date of Patent: Nov. 13, 1984

[54] COATING COMPOSITION OF AN ACRYLIC POLYMER, A POLYESTER RESIN AND AN ETHYLENE/VINYL ACETATE COPOLYMER

[75] Inventor: Michael E. Woodhouse, Farmington, Mich.

[73] Assignee: E. I. Du Pont de Nemours and Company, Wilmington, Del.

[21] Appl. No.: 576,353

[22] Filed: Feb. 2, 1984

[51] Int. Cl.$^3$ .................... B32B 15/08; C08L 33/08; C08L 33/12
[52] U.S. Cl. .................. 428/458; 428/463; 525/166; 525/176; 525/217; 524/89
[58] Field of Search ............... 525/166, 176, 228, 217; 524/89; 428/458, 463

[56] References Cited

U.S. PATENT DOCUMENTS

| | | | |
|---|---|---|---|
| 2,956,902 | 10/1960 | Greif | 525/176 |
| 3,626,026 | 12/1971 | Fukumura | 525/166 |
| 3,705,076 | 12/1972 | Usala | 524/555 |
| 4,042,539 | 8/1977 | Fanning | 525/166 |
| 4,061,616 | 12/1977 | Murayama | 523/455 |

Primary Examiner—John C. Bleutge
Assistant Examiner—Patricia Short
Attorney, Agent, or Firm—Hilmar L. Fricke

[57] ABSTRACT

A coating composition used as a sealer coat in the repair of auto and truck finishes which contains as the film forming binder an iminated acrylic polymer, a polyester resin and an ethylene vinyl acetate copolymer and optionally contains ultraviolet light stabilizers.

9 Claims, No Drawings

COATING COMPOSITION OF AN ACRYLIC POLYMER, A POLYESTER RESIN AND AN ETHYLENE/VINYL ACETATE COPOLYMER

BACKGROUND OF THE INVENTION

This invention is related to a coating composition and in particular to a sealer composition used in refinishing auto and truck topcoats.

Baked enamel high solids finishes and in particular baked enamel color coat/clear coat finishes used on automobiles and trucks are difficult to repair. In clear coat/color coat finishes, a pigmented coat is applied to a substrate of primed metal, plastic or composite structure and then is coated with a clear finish and baked. Adhesion of a repair coating to these baked finishes generally is poor even with sanding of the finish before the repair coating is applied. An intermediate coat or sealer coat is first applied before the repair coating is applied. This sealer coat must have good adhesion to the finish being repaired and provide good adhesion to the repair coating that is applied. Current sealers do not provide the desired level of adhesion. The composition of this invention provides excellent level of adhesion of the repair coating to the finish being repaired.

SUMMARY OF THE INVENTION

A coating composition containing 2–25% by weight of binder and 75–98% by weight of an organic solvent; wherein the binder contains about (a) 60–90% by weight, based on the weight of the binder, of an iminated acrylic polymer of polymerized units of methyl methacrylate, alkyl acrylate or alkyl methacrylate each having 2–12 carbon atoms in the alkyl group and an α-β ethylenically unsaturated monocarboxylic acid at least partially reacted with an alkylene imine; and having a weight average molecular weight of about 20,000–80,000 determined by gel permeation chromatography;

(b) 5–20% by weight based on the weight of the binder, of a polyester resin which is the esterification product of an alkylene glycol, an aliphatic dicarboxylic acid and an aromatic monocarboxylic acid and having a weight average molecular weight of about 1,000–10,000 determined as above;

(c) 5–20% by weight, based on the weight of the binder, of an ethylene/vinyl acetate copolymer of about 5–15% by weight vinyl acetate and 85–95% by weight ethylene and having a number average molecular weight of about 1,000 to 5,000, determined as above.

DESCRIPTION OF THE INVENTION

The coating composition or sealer composition has a film forming binder content of about 2–25% by weight and contains about 75–98% by weight solvent. Preferably, the composition contains 2–10% by weight binder and 90–98% by weight solvent. The binder is a blend of an iminated acrylic polymer, a polyester resin and an ethylene/vinyl acetate copolymer. Preferably the binder contains 70–80% by weight of iminated acrylic polymer, 8–22% by weight of the polyester resin and 8–12% by weight of the ethylene/vinyl acetate copolymer.

The iminated acrylic polymer is prepared by conventional polymerization techniques in which monomers, polymerization catalyst such as azobisisobutyronitrile and solvents are reacted for about 0.5–6 hours at about 70°–250° C. and then an alkylene imine preferably propylene imine is added. Typically, sufficient imine is used to react with about 50–80% of acid groups of the polymer. Typical monomers used to prepare the polymer are as follows: methyl methacrylate, alkyl acrylate or methacrylate having 2–12 carbons in the alkyl group such as ethyl acrylate, propyl acrylate, butyl acrylate, pentyl acrylate, hexyl acrylate, 2-ethylhexyl acrylate, nonyl acrylate, decyl acrylate, lauryl acrylate, ethyl methacrylate, propyl methacrylate, butyl methacrylate, pentyl methacrylate, hexyl methacrylate, 2-ethylhexyl methacrylate, nonyl methacrylate, decyl methacrylate, lauryl methacrylate and the like; α-β ethylenically unsaturated acids such as acrylic acid, methacrylic acid, itaconic acid and the like. The polymer usually contains about 0.1–12% by weight of polymerized α-β ethylenically unsaturated acid monomers.

The iminated acrylic polymer generally has a weight average molecular weight of about 20,000–80,000 determined by gel permeation chromatography using polymethyl methacrylate as a standard.

One preferred iminated acrylic polymer contains 75–85% by weight of methyl methacrylate, 8–24% by weight of ethyl acrylate and 1–7% by weight of methacrylic acid and is reacted with propylene imine and has at least 50% of acid groups reacted with imine.

The polyester resin is prepared by conventional esterification techniques in which the constitutents, i.e., monomers, solvent and catalyst are charged into a polymerization vessel and heated to about 80°–200° C. for about 0.5–6 hours. Water is removed as the constituents are esterified. The resulting alkyd resin should have an acid number less than 30, and preferably, less than 15. The polyester resin has a weight average molecular weight of about 1,000–10,000 determined by gel permeation chromatography.

The polyester resin is the esterification product of an alkylene glycol, an aliphatic dicarboxylic acid and an aromatic monocarboxylic acid.

Typical alkylene glycols that can be used are as follows: ethylene glycol, propylene glycol, diethylene glycol, butane diol, neopentyl glycol, 1,6 hexane diol and the like.

Typical aliphatic dicarboxylic acids that can be used are as follows: adipic acid, oxalic acid, malonic acid, succinic acid, glutaric acid, pimelic acid, suberic acid, azelaic acid, sebacic acid, brassic acid, brassylic acid, roccellic acid and the like.

The following aromatic mono-carboxylic acids can be used to prepare the polyester resin: benzoic acid, paratertiary butylbenzoic acid, phenol acetic acid, triethyl benzoic acid and the like.

The following is a preferred polyester resin: esterification product of neopentyl glycol, adipic acid and benzoic acid.

The ethylene/vinyl acetate copolymer is preferably added to the composition in the form of a dispersion having a solids content of about 1–20% by weight and the copolymer particles of the dispersion have a particle size of within the range of about 0.1–3.0 microns. The copolymer contains about 5–15% by weight of vinyl acetate and 85–95% by weight of ethylene and has a weight average molecular weight of about 1,000–5,000 determined by gel permeation chromatography. One preferred copolymer contains about 88–92% by weight ethylene and 8–12% by weight vinyl acetate and has a weight average molecular weight of about 1000-5000 determined as above.

The ethylene/vinyl acetate copolymer is prepared by conventional techniques using pressure vessels for polymerization in which ethylene under pressure is reacted in the presence of catalyst and solvent with vinyl acetate.

The composition can contain in addition about 0.5-5% by weight, based on the weight of the binder, of ultraviolet light stabilizer.

Typical ultraviolet light stabilizers that are useful are as follows:

Benzophenones such as hydroxydodecyclbenzophenone, 2,4-dihydroxybenzophenone, hydroxy-benzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4-trihydroxy-4'-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'hydroxy-5'-methylphenyl)benzotriazole, 2-(2'-hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlene-substituted oxalic acid diamides, methyl-$\beta$-(3,5-di-t-butyl-4-hydroxyphenyl)propionate, $\alpha,\alpha'$-bis(2-hydroxyphenyl)diisopropylbenzene, 3,5'-dibromo-2'-hydroxyacetophenone, ester derivatives of 4,4-bis(4'-hydroxyphenyl)pentaonic acid wherein there is at least one unsubstituted position ortho to the aromatic hydroxyl groups, organophosphorus sulfides such as bis(diphenyl-phosphinothioyl)monosulfide and bis(diphenylphosphino-thioyl)disulfide, 4-benzoyl-6-(dialkylhydroxybenzyl)resorcinol, bis(3-hydroxy-4-benzoylphenoxy)-diphenylsi-lane, bis(3-hydroxy-4-benzoylphenoxy)-dialkylsilane, 1,8-naphthalimides, $\alpha$-cyano-$\beta,\beta$-diphenylacrylic acid derivatives, bis(2-benzoxazolyl)alkanes, bis(2-naphthoxa-zolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl- or alkyl-substituted acrylonitriles, 3-methyl-5-isopropyl-phenyl-6-hydroxycourmarone.

Particularly useful ultraviolet light stabilizers that can be used are hindered amines of piperidyl derivatives such as those disclose in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni(II), and others listed in the above patent, column 8, line 44 through line 55.

The following blend of ultraviolet light stabilizers is particularly preferred 2-[2'-hydroxy-3',5'-1(1-1-dimethyl-propyl)phenyl]benzotriazole and bis-[4-(1,2,2,6,6-pentamethylpiperidyl)]2-butyl-2-[(3,5-t-butyl-4-hydroxyphenyl)methyl]propanedioate. The stabilizers can be used in any ratio however, a 1:1 ratio of benzotriazole to propanedioate is preferred.

Plasticizers can be used in the composition in amounts up to 10% by weight of the binder. Polymeric plasticizers which can be used are epoxidized soya bean oil, oil free and oil modified alkyds and polyesters, such as polyortho-phthalate esters, polyalkylene adipate esters or polyarylene adipate esters. Monomeric plasticizers that can be used are butylbenzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol poly(propylene adipate)dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, di-2-ethylhexyl ester of hexamethylene diphthalate and di(methylcyclohexyl)phthalate.

One to 20% by weight, based on the weight of the binder, of cellulose acetate butyrate can be used in the composition. The cellulose acetate butyrate preferably has a butyryl content of about 30-55% by weight and a viscosity of 0.1-6 seconds determined at 25° C. according to ASTM-D-1343-56.

Conventional organic solvents can be used in the composition such as acetone, isopropanol, toluene, xylene, dibasic ester solvents such as mixed methyl esters of succinic, glutaric and adipic acids, aliphatic hydrocarbon solvents, alkyl acetates, butanol, ketones such as methylisobutyl ketone, "Cellosolve" acetate and the like.

The composition is applied over a painted substrate by any of the conventional techniques such as spraying, brushing electrostatic spraying, dip coating and the like. It is preferred to lightly sand the painted substrate to improve adhesion of the composition. About ¼-½ mil thick coating is applied to the painted substrate being repaired and dried for 5 minutes to 24 hours and then a typical repair paint is applied. One advantage of the composition is that after drying the resulting coating has a slight haze which makes the area of application visible. After the repair paint has been applied and dried a slight buffing removes haze from that portion of the coating that was not covered with repair paint.

The composition has excellent adhesion to all types of painted auto and truck substrates in which the paint is an acrylic enamel crosslinked with melamine resin, a polyurethane, acrylic polyurethane, acrylic polyurethanes containing melamine resin, alkyd enamel, acrylic alkyd enamels, polyester enamel and the like. Also, the composition has excellent adhesion to clear coat/pigmented basecoat finishes such as acrylic enamel crosslinked with melamine resin used for both coats, acrylic enamels crosslinked with melamine resin, clear coat and a pigmented crosslinked polyester enamel basecoat. Typical alkyd enamel, acrylic enamel, acrylic-alkyd enamel, acrylic lacquer, nitrocellulose lacquer repair paints applied over the sealer composition of this invention have excellent adhesion to the composition.

The following example illustrates the invention. The parts and percentages are on a weight basis unless otherwise specified.

EXAMPLE

The following constituents were blended together to form a sealer.

| Composition A | Parts by Weight |
|---|---|
| Iminated acrylic Polymer Solution (40% solids in solvent blend of isopropanol, toluene, ethyl acetate of a polymer of 81% methyl methacrylate, 14.6% ethyl acrylate, 4.4% methacrylic acid postiminated with 2.91% propyleneimine and having a weight average molecular weight of about 60,000 determined by gel permeation chromatography using polymethyl methacrylate as a standard) | 86.63 |
| Polyester resin solution (90% solids in toluene of a polyester of neopentyl glycol, adipic acid, benzoic acid having an acid no. of 10 and a hydroxyl no. of 16 and a weight average molecular weight of 2,000 measured by gel permeation chromatography) | 7.10 |
| Bis-[4-(1,2,2,6,6-pentamethylpiperidyl)] 2-butyl-2-[(3,5-t-butyl-4-hydroxyphenyl) methyl]propanedioate | 0.46 |
| 2-[2'-hydroxy-3',5'-1(1-1-dimethyl-propyl phenyl]benzotriazole | 0.46 |
| EVA Ethylene/vinyl acetate-copolymer dispersion (6% solids in toluene/butyl acetate of an ethylene/vinyl acetate copolymer of 92% ethylene/8% vinyl acetate having a number average molecular weight of 2,000 measured by gel permeation chromatography and having a particle size of about 0.2–3.0 microns) | 77.78 |
| Acetone | 126.85 |
| Toluene | 222.20 |
| Dibasic Ester Solvent (mixed methyl esters of succinic, glutaric and adipic acids) | 28.60 |
| Aliphatic hydrocarbon solvent | 81.17 |
| Xylene | 76.75 |
| Total | 708.00 |

The resulting sealer composition A, based on solids, contains about 76% by weight iminated acrylic polymer, 14% by weight polyester resin and 10% by weight ethylene/vinyl acetate copolymer.

Three additional sealer compositions B, C and D were prepared, each were identical to the above composition except in composition B EVA-ethylene/vinyl acetate copolymer was omitted, in composition C 5% by weight, based on the weight of the binder, of EVA-ethylene/acetate copolymer was used and in Composition D 20% by weight, based on the weight of the binder, of EVA-ethylene/vinyl acetate copolymer was used.

Four sets of phosphatized primed steel panels were prepared. Each set contained the following painted panels:

(1) clear coat/pigmented base coat, each coat is of an acrylic enamel crosslinked with a melamine resin;

(2) clear coat/pigmented base coat, where clear coat is an acrylic-melamine resin crosslinked enamel and the base coat is a polyester resin;

(3) pigmented acrylic melamine crosslinked enamel;

(4) pigmented alkyd resin enamel;

(5) pigmented acrylic enamel crosslinked with melamine resin made according to U.S. Pat. No. 4,330,458;

(6) pigmented acrylic melamine crosslinked enamel identical to (3) above except exposed to outdoor weathering for 2 weeks.

The bottom half of each panel was lightly sanded.

Each of the above sealer compositions A–D were applied to an individual set of the above panels and dried at ambient temperatures. Then a topcoating of a pigmented acrylic lacquer was applied over the sealer and while still wet a clear coating of an acrylic lacquer was applied and dried at ambient temperatures. The gloss measured at 20° and distinctness of image (DOI) for the top and bottom of each panel was measured. The dry adhesion, wet adhesion after 96 hours exposure to an atmosphere of 100% Relative Humidity at 38° C., and recovered wet adhesion, i.e., adhesion after 24 hours drying at ambient temperature after exposure to the aforementioned atmosphere. Adhesion is measured by cutting through the coating in a cross hatch pattern, applying "scotch" tape and then removing the tape. The rating of 10 shows no loss of adhesion i.e., none of the paint and sealer was removed by the tape. A rate of 0 shows that all of the paint and sealer sealer was removed. Values of 7 above are considered acceptable. The results of the tests are shown in the table. In each case, the first value is for the unsanded top half of the panel and the second value is for the lightly sanded bottom half of the panel.

| | Panel | Gloss 20° | DOI | Dry | Adhesion Wet 96 Hour Exposure | 24 Hour Recovered |
|---|---|---|---|---|---|---|
| Sealer A 10% EVA | (1) | 64/64 | 16/11 | 0/10 | 0/10 | 1/10 |
| | (2) | 68/68 | 18/19 | 10/10 | 10/10 | 10/10 |
| | (3) | 66/72 | 20/19 | 7/10 | 0/10 | 0/10 |
| | (4) | 67/70 | 15/17 | 10/10 | 10/10 | 10/10 |
| | (5) | 71/68 | 17/19 | 0/10 | 0/10 | 0/10 |
| | (6) | 71/71 | 17/14 | 10/10 | 7/10 | 10/9 |
| Sealer B 0% EVA | (1) | 71/76 | 16/19 | 0/10 | 0/10 | 0/10 |
| | (2) | 72/72 | 20/22 | 1/10 | 0/10 | 0/10 |
| | (3) | 67/71 | 17/18 | 0/10 | 0/10 | 0/9 |
| | (4) | 78/71 | 24/30 | 10/10 | 2/10 | 10/10 |
| | (5) | 70/69 | 8/15 | 0/10 | 0/10 | 0/10 |
| | (6) | 72/70 | 26/16 | 10/10 | 3/10 | 8/10 |
| Sealer C 5% EVA | (1) | 65/66 | 13/12 | 0/10 | 0/10 | 0/10 |
| | (2) | 65/70 | 14/16 | 10/10 | 10/10 | 10/10 |
| | (3) | 62/63 | 15/13 | 0/10 | 0/10 | 0/9 |
| | (4) | 69/68 | 13/14 | 10/10 | 10/10 | 10/10 |
| | (5) | 60/61 | 10/8 | 0/10 | 0/10 | 0/9 |
| | (6) | 70/62 | 20/7 | 10/10 | 10/10 | 9/10 |
| Sealer D 20% EVA | (1) | 67/67 | 20/13 | 0/10 | 9/10 | 8/10 |
| | (2) | 73/66 | 18/16 | 10/10 | 10/10 | 10/10 |
| | (3) | 73/65 | 23/12 | 10/10 | 0/10 | 5/9 |
| | (4) | 65/64 | 13/17 | 10/10 | 10/10 | 10/10 |
| | (5) | 69/68 | 15/15 | 0/10 | 0/10 | 0/10 |

-continued

| Panel | Gloss 20° | DOI | Dry | Adhesion Wet 96 Hour Exposure | 24 Hour Recovered |
|---|---|---|---|---|---|
| (6) | 75/63 | 30/9 | 10/10 | 7/10 | 10/10 |

In general, significant improvements in adhesion both dry and under wet conditions were noted with the sealer compositions A, C and D that contained EVA copolymer in comparison to sealer composition B that did not contain EVA copolymer.

I claim:

1. A coating composition comprising 2-25% by weight of binder and 75-98% by weight of an organic solvent; wherein the binder consists essentially of about
    (a) 60-90% by weight, based on the weight of the binder, of an iminated acrylic polymer consisting essentially of polymerized units of methyl methacrylate, alkyl methacrylate or alkyl acrylate each having 2-12 carbon atoms in the alkyl group and an α-β ethylenically unsaturated monocarboxylic acid at least partially reacted with an alkyleneimine; and having a weight average molecular weight of about 20,000-80,000 determined by gel permeation chromatography;
    (b) 5-20% by weight, based on the weight of the binder, of a polyester resin being the esterification product of an alkylene glycol, an aliphatic dicarboxylic acid and an aromatic monocarboxylic acid and having a weight average molecular weight of about 1,000-10,000 determined as above;
    (c) 5-20% by weight, based on the weight of the binder, of an ethylene/vinyl acetate copolymer consisting essentially of about 5-15% by weight vinyl acetate and 85-95% by weight ethylene and having a number average molecular weight of about 1,000 to 5,000, determine as above.

2. The composition of claim 1 containing an additive about 0.5-5% by weight, based on the weight of the binder, of ultraviolet light stabilizers.

3. The composition of claim 2 in which the iminated acrylic polymer consists essentially of polymerized units of 75-85% by weight of methyl methacrylate, 8-24% by weight of ethyl acrylate and 1-7% by weight of methacrylic acid at least partially reacted with propyleneimine.

4. The composition of claim 3 in which the polyester resin is the esterification product of neopentyl glycol, adipic acid and benzoic acid.

5. The composition of claim 4 in which the ethylene/vinyl acetate copolymer consists essentially of 8-12% by weight of vinyl acetate and 88-92% by weight of ethylene.

6. The coating composition of claim 2 in which the ultraviolet light stabilizers consist essentially of 2-[2'-hydroxy-3',5'-(1-1-dimethyl propyl)phenyl]benzotriazole and bis-[4-(1,2,2,6,6-pentamethylpiperidyl)]-2-butyl-2-[(3,5-t-butyl-4-hydroxyphenyl) methyl]propanedioate.

7. The coating composition of claim 1 comprising 2-10% by weight binder and 90-98% by weight solvent, wherein the binder consists essentially of about
    (a) 70-80% by weight of an iminated acrylic polymer consists essentially of polymerized units of 75-85% by weight of methyl methacrylate, 8-24% by weight of ethyl acrylate and 1-7% by weight of methacrylic acid at least partially reacted with propyleneimine;
    (b) 8-22% by weight of a polyester resin consisting essentially of the esterification product of neopentyl glycol, adipic acid and benzoic acid;
    (c) 8-12% by weight of ethylene/vinyl acetate copolymer consisting essentially of 8-12% by weight of vinyl acetate and 88-92% by weight of ethylene, and the composition contains in addition about 0.5-5% by weight based on the weight of the binder of ultraviolet light stabilizers consisting essentially of 2-[2'-hydroxy-3',5'-(1-1-dimethylpropyl)phenyl]benzotriazole and bis-[4-(1,2,2,6,6-pentamethylpiperidyl)]-2-butyl-2-[(3,5-t-butyl-4-hydroxyphenyl)methyl]propanedioate.

8. A substrate coated with a layer of the composition of claim 1.

9. A metal substrate coated with a paint layer which is coated with the composition of claim 1 and which is coated with another paint layer.

* * * * *